Sept. 19, 1950    R. CARSON    2,523,193
PIPE SPINNER

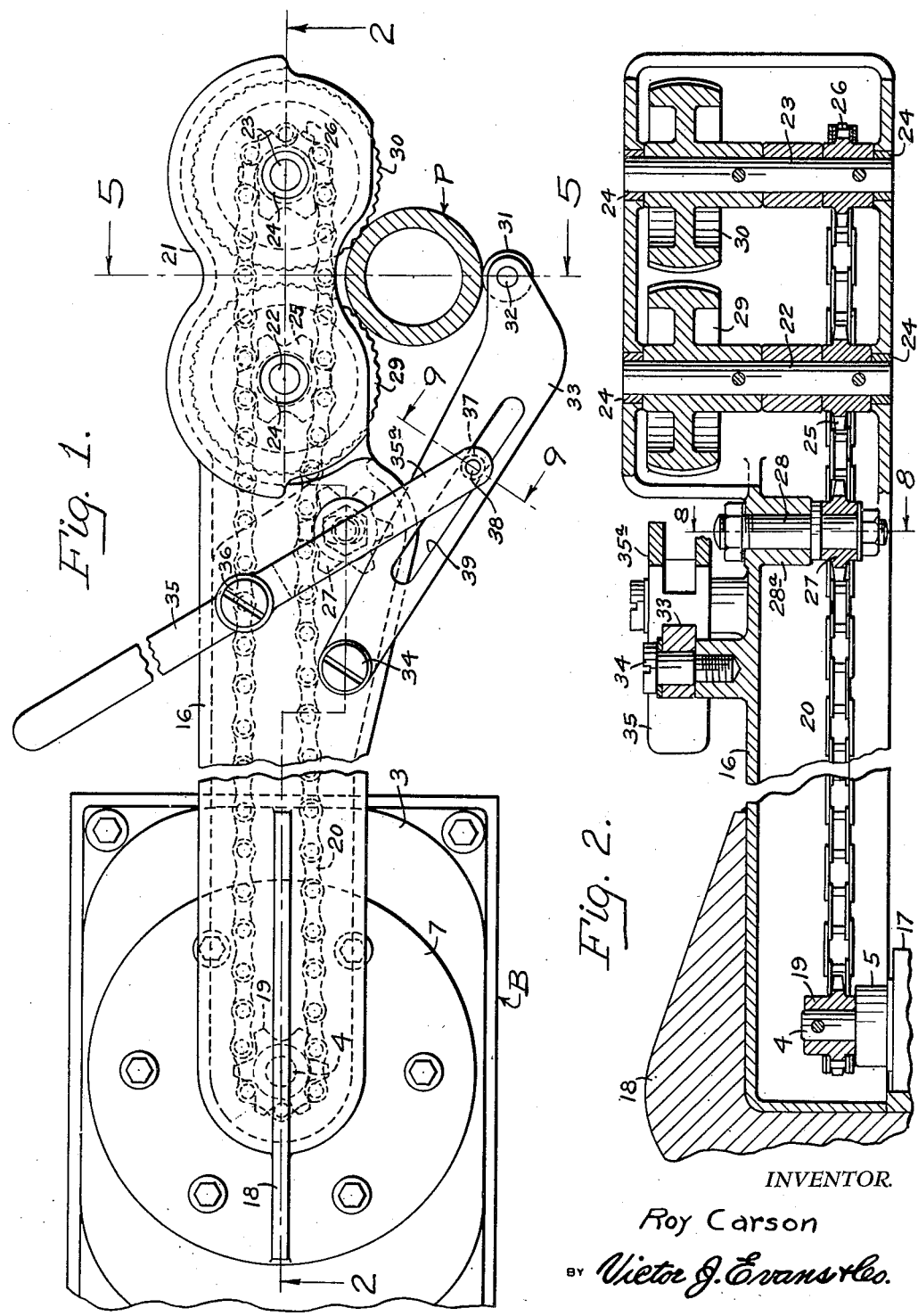

Filed Dec. 23, 1946    3 Sheets-Sheet 2

INVENTOR
Roy Carson
BY Victor J. Evans & Co.
ATTORNEYS

Sept. 19, 1950     R. CARSON     2,523,193
PIPE SPINNER
Filed Dec. 23, 1946     3 Sheets-Sheet 3
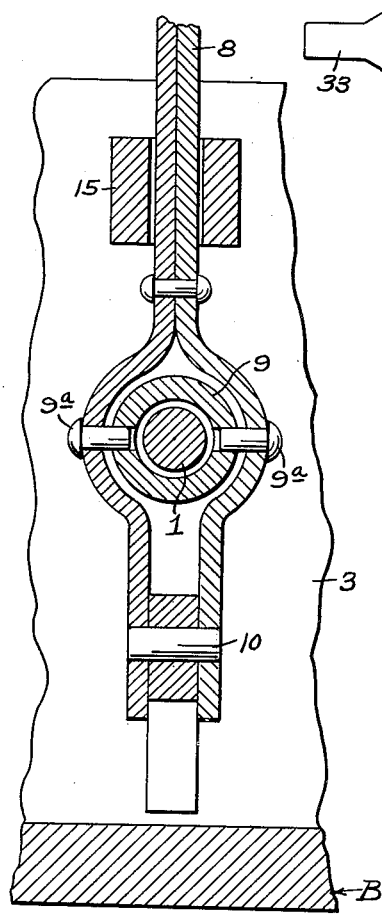
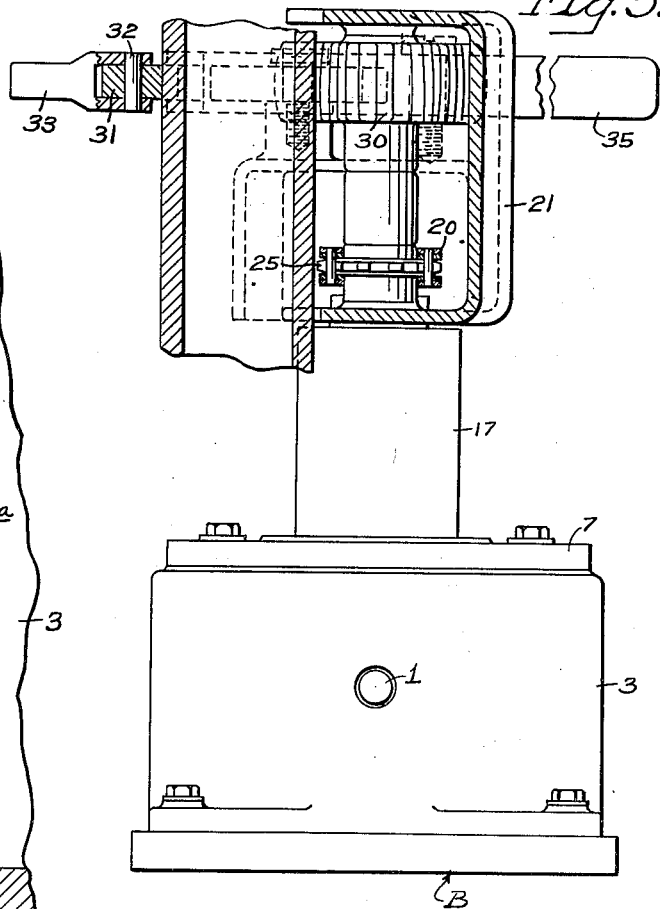
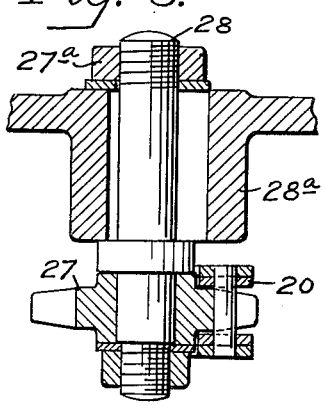
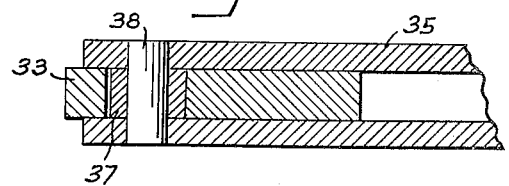
INVENTOR.
Roy Carson
BY *Victor J. Evans & Co.*
ATTORNEYS Patented Sept. 19, 1950

2,523,193

UNITED STATES PATENT OFFICE 2,523,193

PIPE SPINNER

Roy Carson, Holliday, Tex.

Application December 23, 1946, Serial No. 718,055

1 Claim. (Cl. 255—35)

The present invention relates to power operated earth boring implements, well drilling machines, and drilling rigs of the rotary type, and more specifically to an improved pipe spinner or manually controlled power operated machine tool for turning or spinning screw threaded pipes, tubes, rods and other similar equipment in well drilling. The rotary machine is of the horizontal type, and it is adapted to turn a threaded pipe while the latter is standing in upright position, for screwing the upper pipe section into a lower pipe-section, and the rotary operating mechanism is vertically adjustable for adaptation to equipment of varying heights or dimensions.

The primary object of the invention is the provision of a power operated machine of this type that is composed of a minimum number of standardized parts that may with facility be manufactured, and assembled with convenience, to insure an easily controlled and manually operated gripping action of rotary rollers on the pipe for turning the pipe, together with simplified releasing means that permit the required descending movement of the pipe, or other equipment.

Means are provided for reversing the movement of the rotary gripping rollers from a right hand screw threading action to a left-hand unscrewing action for a pipe section, thus readily adapting the machine for use in "fishing" operations, recovery of lost tools, and other incidental operations required in well drilling processes. While the machine of my invention is adapted for use in frictionally gripping and rotating the usual drill rods, spindles, tubes, and other similar parts, of various sizes or diameters, for convenience of illustration and description I have disclosed in the drawings and described a pipe that may with safety and convenience be turned for threading purposes.

The invention consists in certain novel features of construction and combinations and arrangements of parts as will hereinafter be described, and more specifically set forth in the appended claim.

In the accompanying drawings I have illustrated one complete example of a physical embodiment of my invention wherein the parts are combined and arranged in accord with one mode I have devised for the practical application of the principles of my invention. It will however, be understood that changes and alterations may be made, and are contemplated, in these exemplifying drawings and mechanical structures, within the scope of my claim, without departing from the principles of the invention.

Figure 1 is a top plan view of the swiveled portion of a machine embodying my invention, the motor connections being omitted for convenience in illustration, and showing the power operated gripping rollers and the manually controlled presser roller in their relation to a pipe that is shown in cross section.

Figure 2 is a vertical longitudinal sectional view as at line 2—2 of Fig. 1.

Figure 5 is a view in elevation of the base and swivel joint of the machine, with a vertical transverse sectional view at line 5—5 of Fig. 1 through the swiveled housing of the machine.

Figure 7 is an enlarged transverse vertical sectional view at line 7—7 of Fig. 3 of the means for mounting the gear shift lever on the reversible drive shaft.

Figure 8 is an enlarged vertical sectional view, as at line 8—8 of Fig. 2, showing the adjustable guide sprocket or endless chain together; and Figure 9 is a transverse vertical sectional view at line 9—9 of Fig. 1 of the manually controlled presser mechanism.

Figure 4:
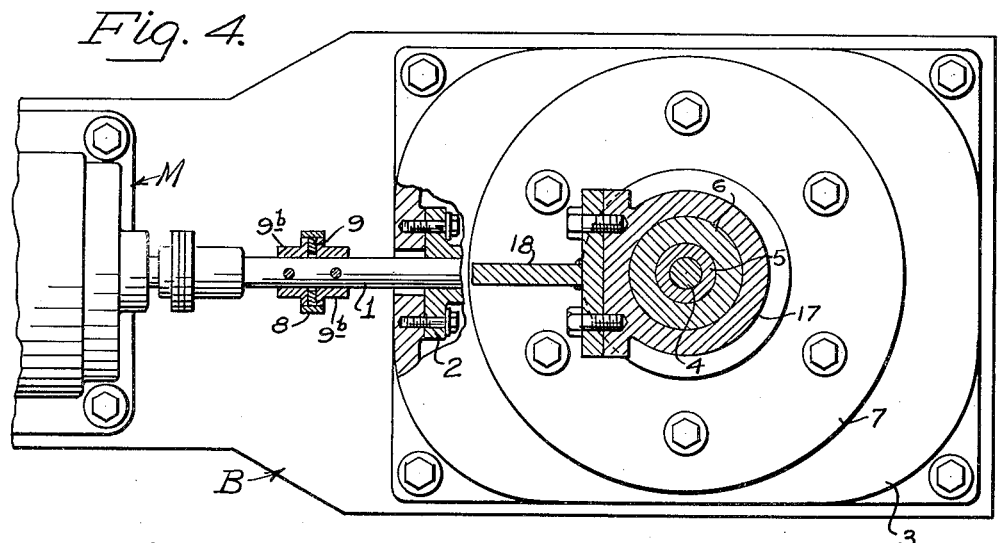
Figure 4 is a horizontal sectional view as at line 4—4 of Fig. 3.

In carrying out my invention I utilize a base or bed plate B, upon which a suitable motor M is supported to revolve the horizontally disposed drive shaft I that is journaled to revolve and slide in bearings 2, 2, of the hollow base or housing 3, with means for transmitting power to the upright driving shaft or sprocket shaft 4 that is journaled in bearings 5, 5, of an upright sleeve 6 forming a fixed bearing head and a flat horizontal attaching flange 7 that is rigidly bolted on the top of the hollow base 3.

Transmission of power is controlled, and may be reversed by operation of a manual lever or shift lever 8 which is pivotally connected with the collar 9 by trunnions or pins 9a, and the collar 9 is thus loosely mounted on the shaft, between fixed and spaced collars 9b, and adapted to longitudinally shift the shaft in its bearings. The lower end of the shift lever is pivoted at 10 on a bracket that is rigid with the hollow base 3, and the shifting movement of the lever controls a pair of spaced bevel gears or pinions 11 and 12 pinned to the shiftable shaft and located in the hollow base 3.

Figure 6:
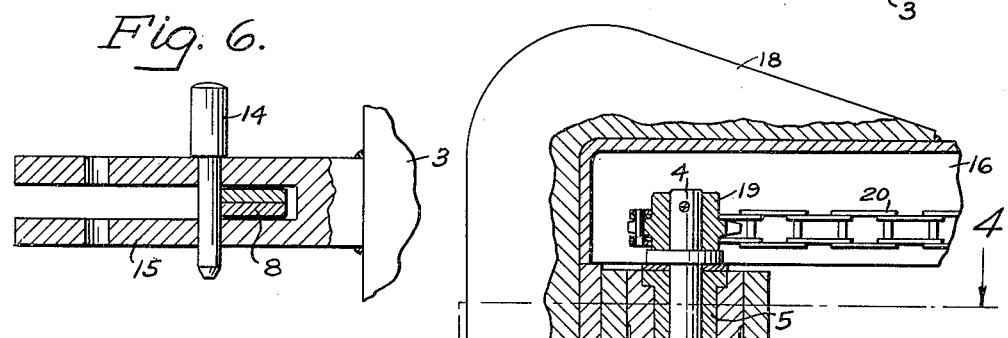
Figure 6 is an enlarged detail sectional view, at line 6—6 of Fig. 3 showing the selective retaining devices for the gear shift lever of the rotary reversing drive.
Figure 3:
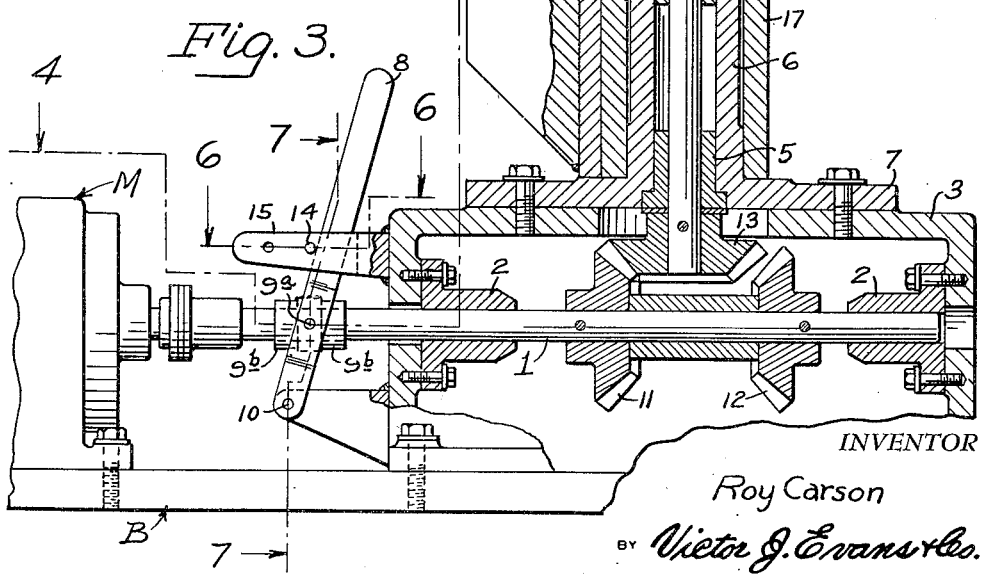
Figure 3 is a vertical sectional view of the power take off mechanism and reversible drive for the endless drive chain of the gripping rollers, showing also a portion of the motor, and the gear shift mechanism.

For alternate forward and reverse drive these gears 11 and 12 are adapted to engage and co-act with a driven bevel gear 13 that is rigidly mounted at the lower end of the driven upright sprocket shaft 4, and in Fig. 6 a pin 14 is shown that is selectively used in holes of a bracket 15 mounted on the hollow base, for retaining the lever in adjusted position.

For transmitting power from the upright sprocket shaft 4 an endless chain and sprocket mechanism is provided in a horizontally disposed housing or tubular arm 16, here shown as having an open bottom portion, and of suitable length to permit necessary adjustment of the rotary grippers of the machine to the pipe section P. This tubular arm, housing, or chain-guard is adapted to be swung manually in a horizontal plane transversely of the upright pipe, and for this purpose the housing at its inner end is equipped with a swivel-head 17 and braced attaching plate 18, the cylindrical head 17 being rotatably journaled or swiveled on the fixed cylindrical sleeve or bearing 6.

Within the swivel end of the chain-guard a driving sprocket 19 is rigidly mounted upon the upper end of the upright sprocket shaft 4, to actuate an endless drive chain 20 that is enclosed and guarded within the tubular housing 16, and at its outer, free end, the chain guard or arm terminates in an enlarged hollow head 21 in which are journaled two spaced upright stud shafts 22 and 23 in bearings 24. The endless chain extends throughout the length of the tubular chain-guard and the outer end of the chain is looped around two sprocket wheels 25 and 26 of shafts 22 and 23 respectively to revolve the sprockets and shafts simultaneously in the same direction.

For properly tightening the chain upon the two driven sprockets, and for maintaining the moving flights of the chain in proper relationship, an adjustable guide sprocket or idler 27, as best seen in Fig. 8, is provided for the chain. The sprocket wheel 27 is rigidly mounted upon an upright stud shaft 28 at one side of a chain flight, and a slotted bearing 28a extending transversely of the chain is provided for the stud shaft in order that the shaft and its sprocket may be adjusted toward and away from the chain, and secured in adjusted position by a lock bolt 27a threaded on the upper projecting end of the stud shaft.

For gripping and rotating the pipe P two friction rollers 29 and 30 are rigidly mounted on to revolve with the respective shafts 22 and 23, within the hollow head 21, and these two rollers revolving in the same direction are provided with suitable, exterior friction means, as cross ribs and grooves on their peripheries for gripping the exterior periphery of the pipe P, but it will be understood that any other appropriate friction means may be employed to enhance the gripping action of the rollers in turning the pipe, or other equipment.

In use, the revolving grippers or rollers are held against one side of the pipe by pressure applied to the swiveled chain guard, to turn the pipe, and manually controlled pressure is applied at a diametrically opposite point of the pipe to hold the grippers in operative position.

For this purpose a comparatively small pressure roller 31, which bears against the pipe, is journaled at 32 in the free end of a forked lever arm 33 which is pivoted on a vertical axis at 34 on the top of the chain-guard near the hollow head of the guard. The lever arm is actuated by an operating lever 35 shown as pivoted at 36 transversely of the chain guard and mounted over the top of the guard. The forked working arm 35a of the lever 35 has journaled in its end a guide roller 37 that is journaled at 38, and the power of the manually operated pressure lever is applied to the lever arm through the roller 37 to the walls of a slot 39 of the lever arm 33.

By this slotted arrangement and roller of the lever mechanism the holding or pressure roller 31 may be adjusted to varying diameters of pipe sections to be turned, and the operator may bear against or push against the lever 35 to apply the desired pressure against the pipe P. The operator, standing in position for a push against the lever, is also in position to push or bear against the head of the chain guard, thus clamping the three rollers in gripping relation on the pipe to turn the latter. By manipulating the hand lever 35 to apply and release the gripping pressure the operator may control both the rotary movement of the pipe, as well as the vertical movement due to screw threading action.

The two gripping rollers and the presser roller provide a three-point application of power to the pipe which not only stabilizes the upright position of the pipe section with relation to the next lower section, but this multiple grip in addition facilitates the screw-threading operation by maintaining the pipe P on its axial center.

The operation of the endless chain drive is conveniently controlled by the lever 8, and when necessary or desirable the direction of rotation of the gripper rollers may be reversed with smoothness by manipulation of the lever 8 to change the grippers from a right-hand movement to a left-hand movement.

The swiveled chain-guard or pivoted beam 16 permits ready adjustment of the head 21 and the gripping rollers, in applying the rollers to and withdrawing them from the pipe, and the lever actuated holding or pressing device is readily adjustable to permit adjustment of the rollers; and the chain-guard with the gripping rollers may be swung entirely away from the pipe when not required for use.

Having thus fully described my invention, what I claim as new and desire to secure by Letters Patent is:

The combination with a base, a tubular arm swiveled on the base and a head on the free end of the arm, an endless drive chain mounted in the arm, and operating means therefor, of a pair of shafts journaled in the head and sprocket wheels on said shafts co-acting with the chain, a laterally arranged guide sprocket adjustably mounted in the arm for co-action with the chain, a holder pivotally mounted on the arm and a friction roller journaled in the holder in opposition to said head, a pair of gripping rollers mounted on the shafts within the head, and an actuating lever pivoted on the tubular arm for pressing the holder and its roller into co-action with the gripping rollers.

ROY CARSON.

REFERENCES CITED

The following references are of record in the file of this patent:

UNITED STATES PATENTS

| Number | Name | Date |
| --- | --- | --- |
| 1,481,157 | Smith | Jan. 15, 1924 |
| 1,502,156 | Pearce et al. | July 22, 1924 |
| 1,505,007 | Cox et al. | Aug. 12, 1924 |
| 1,760,167 | Palmer | May 27, 1930 |
| 1,805,007 | Pedley | May 12, 1931 |
| 2,311,225 | Grable | Feb. 16, 1943 |
| 2,400,712 | Prather et al. | May 21, 1946 |